(12) United States Patent
Ashe (10) Patent No.: US 7,844,918 B1
(45) Date of Patent: Nov. 30, 2010

(54) DESKTOP THUMBNAILS WITH PAGE CONTROLLERS

(75) Inventor: Dylan Ashe, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 181 days.

(21) Appl. No.: 11/316,139

(22) Filed: Dec. 22, 2005

(51) Int. Cl.
*G06F 3/048* (2006.01)
(52) U.S. Cl. .................. 715/838; 715/764; 715/810; 715/835; 715/847
(58) Field of Classification Search .......... 715/764, 715/810, 835, 838, 847; 345/348, 349
See application file for complete search history.

(56) References Cited

U.S. PATENT DOCUMENTS

| | | | |
|---|---|---|---|
| 5,680,558 A * | 10/1997 | Hatanaka et al. | 715/838 |
| 6,496,206 B1 | 12/2002 | Mernyk et al. | |
| 6,590,585 B1 * | 7/2003 | Suzuki et al. | 715/719 |
| 7,055,106 B2 | 5/2006 | Shibata | |
| 7,496,859 B2 * | 2/2009 | Watanabe | 715/838 |
| 7,614,009 B2 * | 11/2009 | Dart et al. | 715/781 |
| 2002/0075312 A1 * | 6/2002 | Amadio et al. | 345/764 |
| 2002/0122073 A1 * | 9/2002 | Abrams et al. | 345/838 |
| 2002/0186258 A1 * | 12/2002 | Shibata | 345/838 |
| 2003/0076322 A1 * | 4/2003 | Ouzts et al. | 345/440 |
| 2005/0223329 A1 * | 10/2005 | Schwartz et al. | 715/711 |
| 2005/0251758 A1 * | 11/2005 | Cummins et al. | 715/838 |
| 2006/0224997 A1 * | 10/2006 | Wong et al. | 715/838 |
| 2007/0136750 A1 * | 6/2007 | Abanami et al. | 725/44 |

* cited by examiner

*Primary Examiner*—Steven P Sax
*Assistant Examiner*—Grant D Johnson (57) ABSTRACT

A method, apparatus and computer program product for displaying a graphical element within a graphical user interface is presented. A registration is made with an operating system (OS) to be sent a notification when a predetermined file type is being displayed in a user's desktop. At some time an event notification is received regarding the graphical element. A file to display as a graphical element is determined, as is a location to position the graphical element in the user's desktop. The graphical element representing the file is displayed, as is a segment controller with the graphical element, the segment controller operable to permit a user to select which segment of the file to be displayed in the graphical element.

20 Claims, 6 Drawing Sheets

DESKTOP THUMBNAILS WITH PAGE CONTROLLERS

BACKGROUND

Conventional computerized devices, such as personal computers, laptop computers, and the like utilize a graphical user interface (GUI) that enables users to interact with the computerized device. In general, using a graphical user interface, a user operates an input device such as a mouse or keyboard to manipulate graphical elements or objects on a computer display. The graphical elements objects are often represented as icons or thumbnails, and the user can operate an input device such as a mouse to move a mouse pointer onto a graphical element (i.e., graphically overlapping the thumbnail) on the graphical user interface. By depressing a mouse button, the application (such as the operating system desktop) selects the graphical element, and if the user maintains the mouse button in a depressed state, the user can drag the icon across the graphical user interface. By releasing the mouse button, the icon is placed on the graphical user interface at the current position of the mouse pointer.

One type of graphical element is a thumbnail (also referred to as an icon) which typically comprises a small image representation of a larger image, usually intended to make it easier and faster to look at or manage a group of larger images. For example, software that lets you manage a number of images often provides a thumbnail version of each image so that you don't have to remember the file name of each image. A thumbnail is also used to mean a small and approximate version of an image or a brochure layout as a preliminary design step. Web sites with many pictures, such as online stores with visual catalogs, often provide thumbnail images instead of larger images to make the page download faster. Programs often let you click on the thumbnail to retrieve a larger version of the image or document.

SUMMARY

Conventional technologies for presenting graphical elements (e.g., icons or thumbnails) suffer from a variety of deficiencies. In particular, conventional technologies for presenting graphical elements provide only a view of the first page of the document associated with the thumbnail. Other pages of the document, which may be more useful for the user to view, are not presented. Certain software applications are available which provide multiple page views as individual icons. For example, the Acrobat® viewer available from Adobe Systems Incorporated of San Jose, Calif. enables a user to view a sequence of thumbnails of viewable pages as a way to navigate among the pages in a document. Another application is Photoshop® also available from Adobe Systems Incorporated of San Jose, Calif. allows a user to view a thumbnail version of certain kinds of images.

Embodiments disclosed herein significantly overcome such deficiencies and provide a system that includes a computer system executing a graphical element displaying process within a graphical user interface. The graphical element displaying process allows a user to view a graphical element associated with a file and to select a particular segment of the file to be represented within the graphical element without having to run a separate software application. The term file as used herein, is intended to represent any type of file including but not limited to a portable document format (.pdf) file, a video file, a text file, a graphical file, an image file, a sound file, a spreadsheet and the like. The term segment as used herein is intended to refer to any piece of a file including but not limited to a page of a file, a sheet of a spreadsheet, a frame of a video file, a chapter of a video file or the like.

In a particular embodiment of a method of displaying a graphical element within a graphical user interface, the method includes registering with an operating system (OS) to be sent a notification when a predetermined file type is being displayed on a display device (e.g., in a user's desktop). The method further includes receiving an event notification regarding the graphical element. The method additionally comprises determining a file to display as a graphical element. The method also includes displaying the graphical element representing the file, and displaying a segment controller with the graphical element, the segment controller operable to permit a user to select which segment of the file to be displayed in the graphical element.

Other embodiments include a computer readable medium having computer readable code thereon for displaying a graphical element within a graphical user interface, the medium including instructions for registering with an operating system (OS) to be sent a notification when a predetermined file type is being displayed in a user's desktop. The medium also includes instructions for receiving an event notification regarding the graphical element. The medium further includes instructions for determining a file to display as a graphical element. The medium further still includes instructions for displaying the graphical element representing the file, and instructions for displaying a segment controller with the graphical element, the segment controller operable to permit a user to select which segment of the file to be displayed in the graphical element.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides for displaying a graphical element within a graphical user interface as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product in one embodiment that has a computer-readable medium including computer program logic encoded thereon that when performed in a computerized device provides associated operations for displaying a graphical element within a graphical user interface as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Adobe Systems Incorporated of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments disclosed herein include methods and a computer system that perform a graphical element displaying process within a graphical user interface. The graphical element displaying process allows a user to select graphical elements which are provided with a segment controller such that the user can select a particular segment of the document associated with the graphical element to be displayed within the graphical element. A plug-in module registers with an operating system (OS) to be sent a notification when a predetermined file type is being displayed in a user's desktop. At some point in time an event notification is received regarding the graphical element. A determination is made regarding a file to display as a graphical element. The graphical element is displayed representing the file, as is a segment controller with the graphical element, the segment controller operable to permit a user to select which segment of the file is to be displayed in the graphical element.

Figure 1:
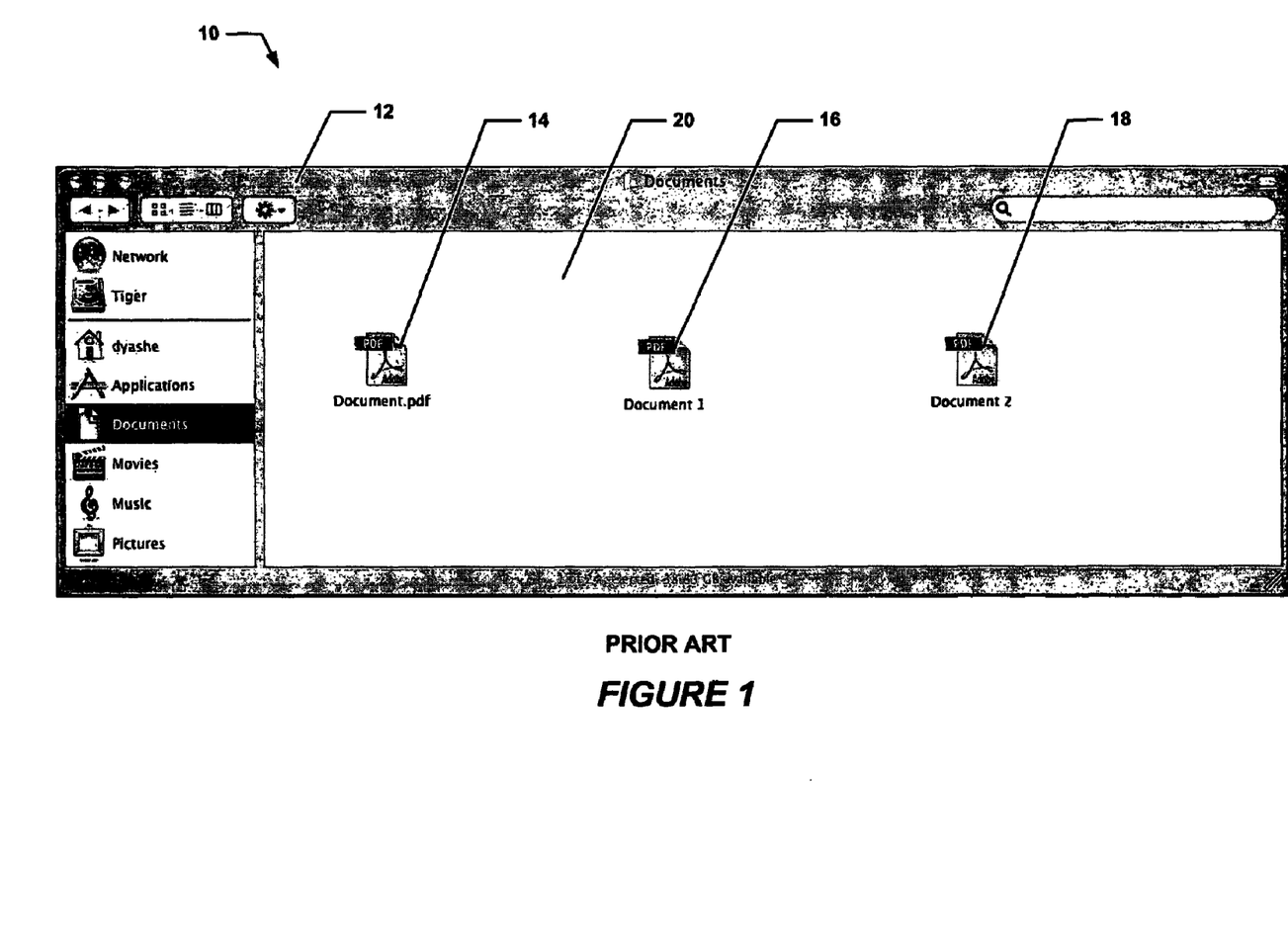
FIG. 1 illustrates a prior art GUI, showing a users desktop having three files displayed as icons therein.

Referring now to FIG. 1, a prior art graphical user interface 10 is shown. The GUI 10 shows a users desktop 20 which includes three graphical elements (also referred to herein as thumbnails or icons). Graphical element 14 represents a portable document format (.pdf) file titled "Document.pdf", graphical element 16 represents a .pdf file titled "Document 1", and graphical element 18 represents a .pdf file titled "Document 2". Each of the graphical elements shows a default Adobe® symbol within the graphical element.

In a preferred embodiment which has MacOS X running on a system, there is a mechanism called a CMM (Contextual Menu Extension) which allows applications to add "right click" capability the users desktop (e.g. right click on a file and have a menu of options displayed). The present invention, in this embodiment, uses the CMM to add the new desired functionality.

The CMM uses the standard OS CMM mechanisms to register itself at startup. Specifically, in this example, the CMM registers as interested in the .pdf file type and to send "an event" any time a .pdf file is being displayed in the desktop. At that point the CMM "goes to sleep" until one of the events occurs.

One event of interest is the "selection" event—meaning that an icon has become selected. One way an icon can be selected is a mouse-over or hover, which does not require an actual click. When a hover or mouseover event is performed over the thumbnail, the segment selection bar can appear.

When a selection event is received, a check is done to make sure a .pdf file is in the selection, and if so, a "Show Thumbnails" option is added to the right-click menu (the base menu is provided by the OS as part of the selection event).

Figure 2:
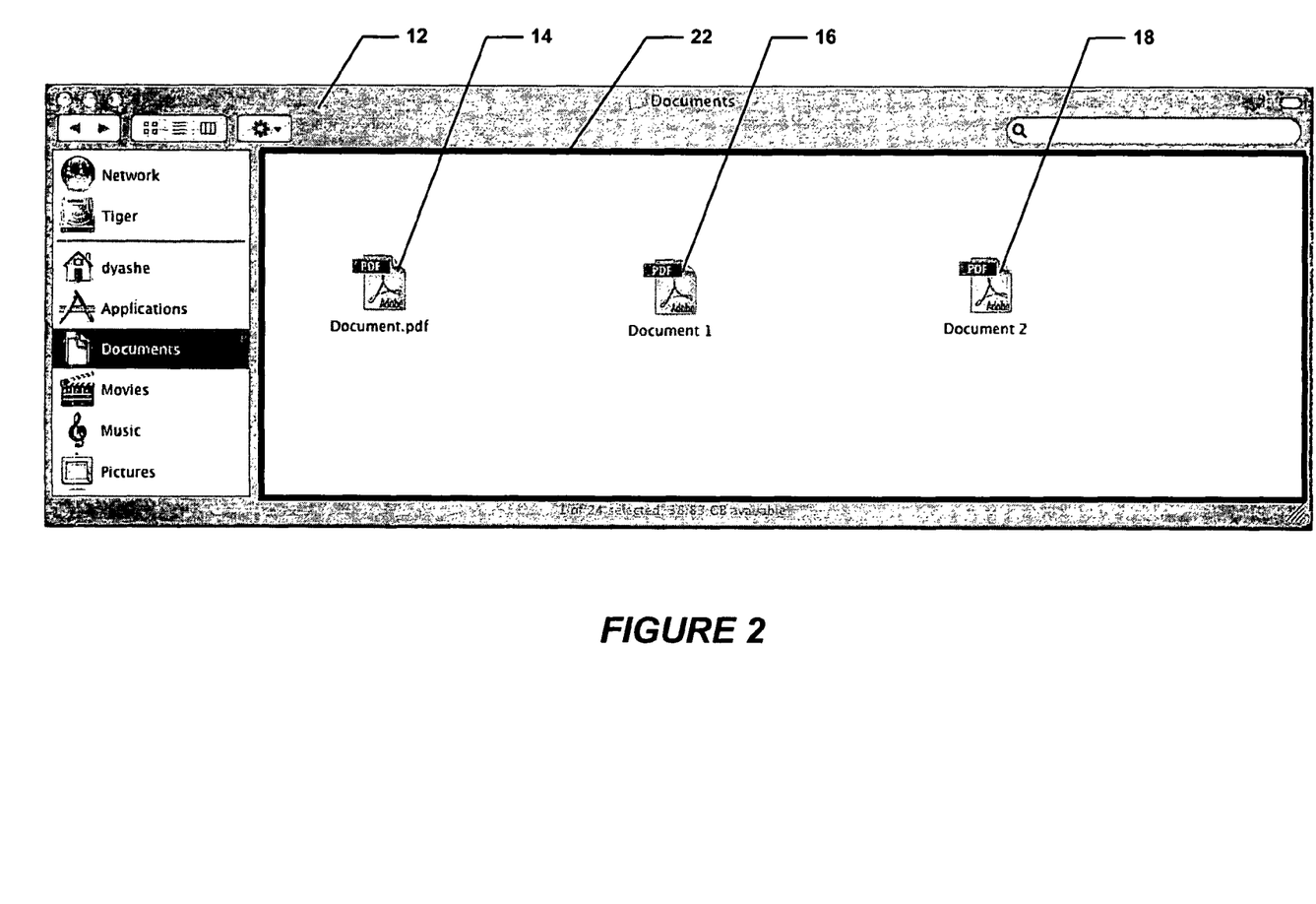
FIG. 2 is an illustration showing three files in a new display area of the users desktop in accordance with aspects of the present invention.

Referring now to FIG. 2, a similar GUI showing a users desktop is shown. When the task of drawing thumbnails is performed, in accordance with embodiments of the present invention, the normal OS drawing area is obscured with a new drawing area. This is accomplished by providing a new window to draw into (it's a frameless drawing area shown in the black box 22), which is overlaid on top of the OS window. The OS window grouping mechanism is used to make sure the new drawing area always stays on top, stays in the right location, is resized correctly, etc.

At that point, the target directory is read in order to obtain the file list. Also read is the target directory .DS_Store file to determine the positions for the graphical elements on the desktop display. The .DS_Store file is a file maintained by the OS indicating where each icon resides.

A preference file is also read to determine what segment of the document to display for each thumbnail. If no preference is found, then the first segment will be displayed within the graphical element. In this example Adobe® Portable Document Format Library PDFLib® is then called to generate the actual thumbnail for each document using the segment provided and the coordinates found in the .DS_Store file.

Figure 3:
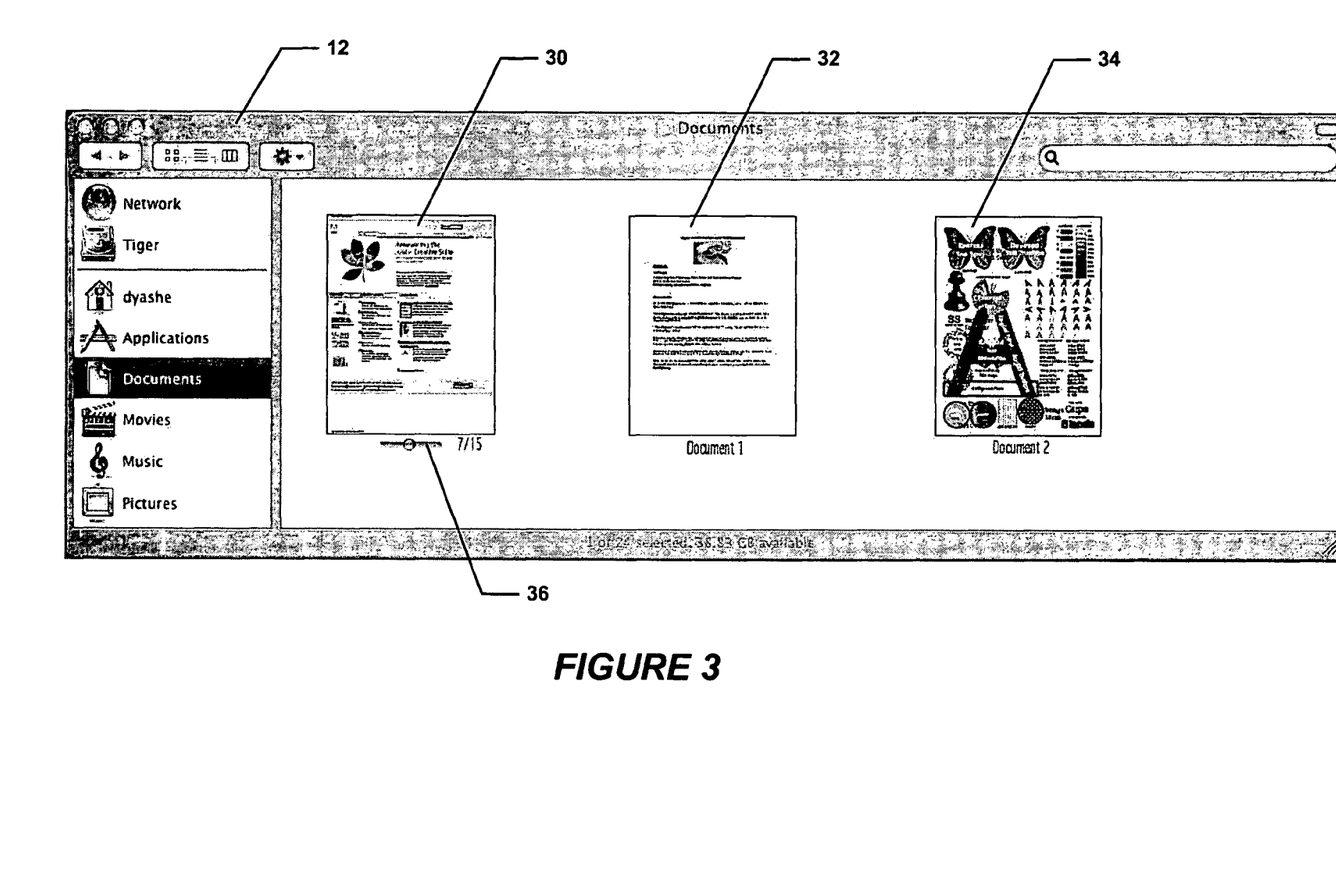
FIG. 3 shows graphical elements wherein a selected graphical element includes a segment controller for selecting a segment to display within the selected graphical element in accordance with aspects of the present invention.

Referring now to FIG. 3, in one embodiment the three graphical elements from FIG. 2 are shown redrawn in scan mode. At this point, since the new window has been overlaid over the prior window, various operations can be performed. Using standard OS X Carbon Event handling mechanisms, a registration can be made for mouse-down events for each rectangle specified for each icon provided in the new window. That allows the present invention to determine if the user then clicks in those rectangles, and if so, to change the graphical element from view mode to scan mode which causes the icon name area to be swapped out and replaced with a scroll bar. Each time the user adjusts the thumb on the scroll bar, the graphical element is regenerated with the segment desired. For example, for a text document this is accomplished by taking the page number, providing the page number to PDFLib®, and having PDFLib® render the actual page contents into the graphical element. To the right of the scroll bar is current page/total page count that is constantly updated. Clicking on a different icon, no icon, or closing the window causes the current segment displayed value to stick. This value is saved on a per-document-basis in our preference file. Clicking Escape while scanning, causes any changes to the segment displayed to be discarded. The present invention is also responsible for drawing everything in the window including folders and non-PDF file icons that are in that directory as well. The standard OS system services are used to retrieve document and folder icons (as appropriate) and draw them when encountered in the directory.

The first graphical element 30 is shown in the process of flipping through the segments. Along the bottom of graphical element 30 is control 36 that allows the user to browse through the segments. Clicking on the ball (or thumb) and dragging it to the left, permits the user to browse backward through the document. Clicking on the ball and dragging it to the right, allows the user to browse forward through the document. To the right of the controller is shown the current segment and total segments (e.g., 7/15 in this example). The segment count updates dynamically as the controller thumb moves. The new thumbnail segment "sticks" to what segment is being displayed when the graphical element becomes deselected (e.g., the user clicks on a new icon or closes the window). If the user hits the Escape key while changing the segments, the document becomes deselected and the segment displayed returns to what was previously displayed (e.g., canceling the new segment thumbnail display).

The other two graphical elements 32 and 34 show different segments of different documents being displayed. The segment controller is only visible when the document is selected, and takes up the real estate on screen normally occupied with the document name (meaning you cannot see the document name when flipping through the segments). This is done to minimize the amount of screen space taken up by the controller and to allow the largest graphical element possible to be displayed.

In another embodiment there is support built into the Operating System to provide support so that the user does not need to perform the "right click" operation. In this embodiment a Thumbnail Renderer is provided as a plug-in to the OS that handles thumbnails support for a specific file type. The OS calls the renderer each time it encounters an icon of the registered type in one of its windows to allow the renderer to provide the actual drawing.

A Thumbnail Renderer receives and handles the following messages from the OS:

A first message the Thumbnail Renderer receives and handles from the OS is
   bool Open(UTF8* file, HWND window, Proc hasBecomeSelected).

The Open message is sent to the renderer when an icon becomes visible that needs to be rendered. The argument file is UTF8 encoded path to the file that the icon is based on. The HWND window is sized to the size of the icon the OS wants the renderer to draw. From there the renderer can create it's own child window to that HWND, attach message handlers to it (e.g. to catch messages that it's being sized, moved, mouse clicks, closed, etc). If a close message is received, the render cleans up and shuts down. If mouse clicks are received, they can be intercepted if they are over drawn segment controllers (described above) or ignored, allowing the OS to catch and handle the clicks for selection or double-clicking to actually open the document in an application.

A second message the Thumbnail Renderer receives and handles from the OS is
   void Select(bool select)

This tells the renderer to draw the icon selected (if select is true) or non-selected (if select is false). This information is used to display the segment controller (if selected).

Another message the Thumbnail Renderer receives and handles from the OS is
   bool Rename(UTF8* newname)

This tells the renderer that the file the icon is based on has moved in the directory structure and this is its new location. By way of this embodiment is the removal of the requirement of performing a right click and choosing the "show Thumbnails" menu selection.

Figure 4A:
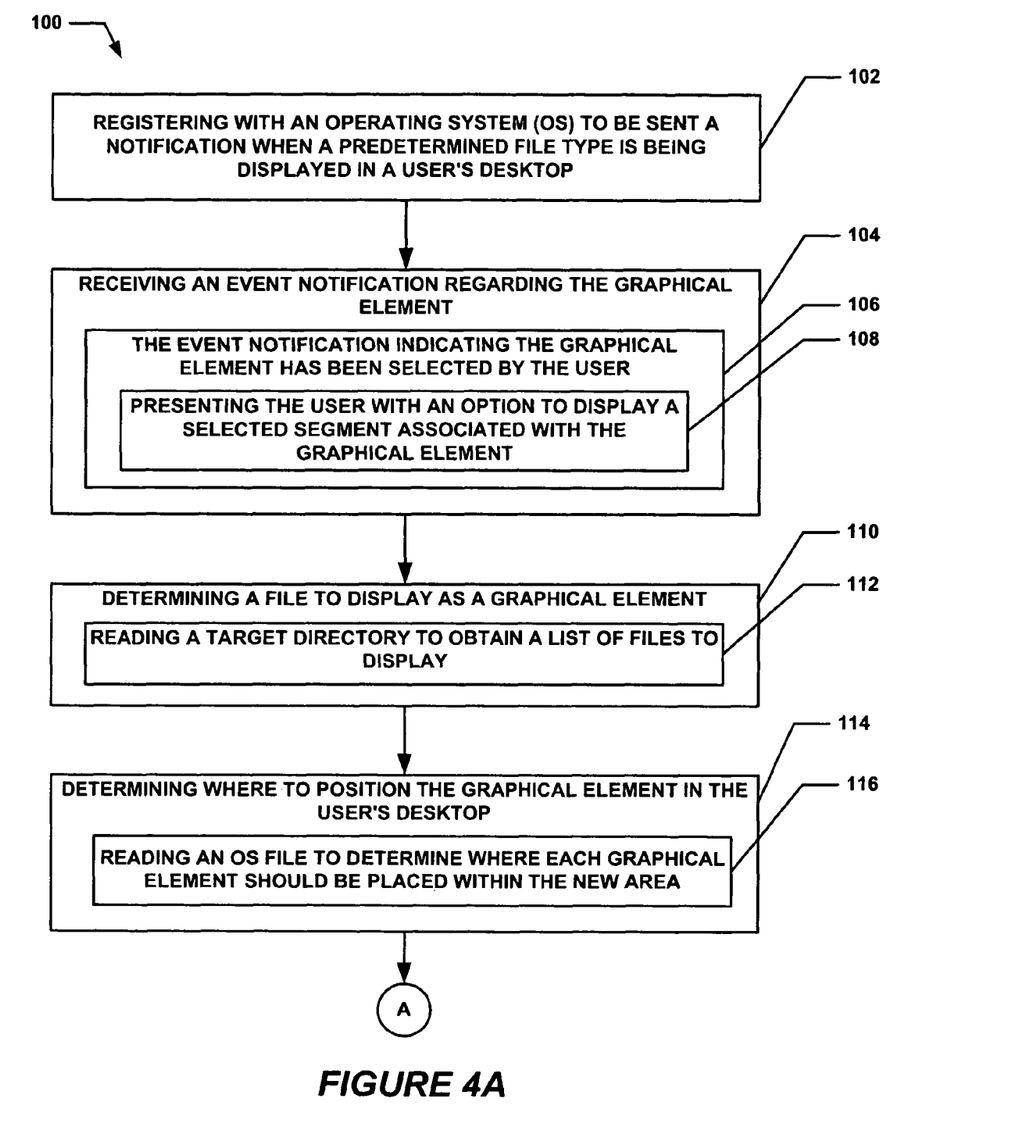
FIGS. 4A and 4b illustrate a flow diagram of a particular embodiment of a method for displaying a graphical element in a GUI in accordance with aspects of the present invention.
Figure 4B:
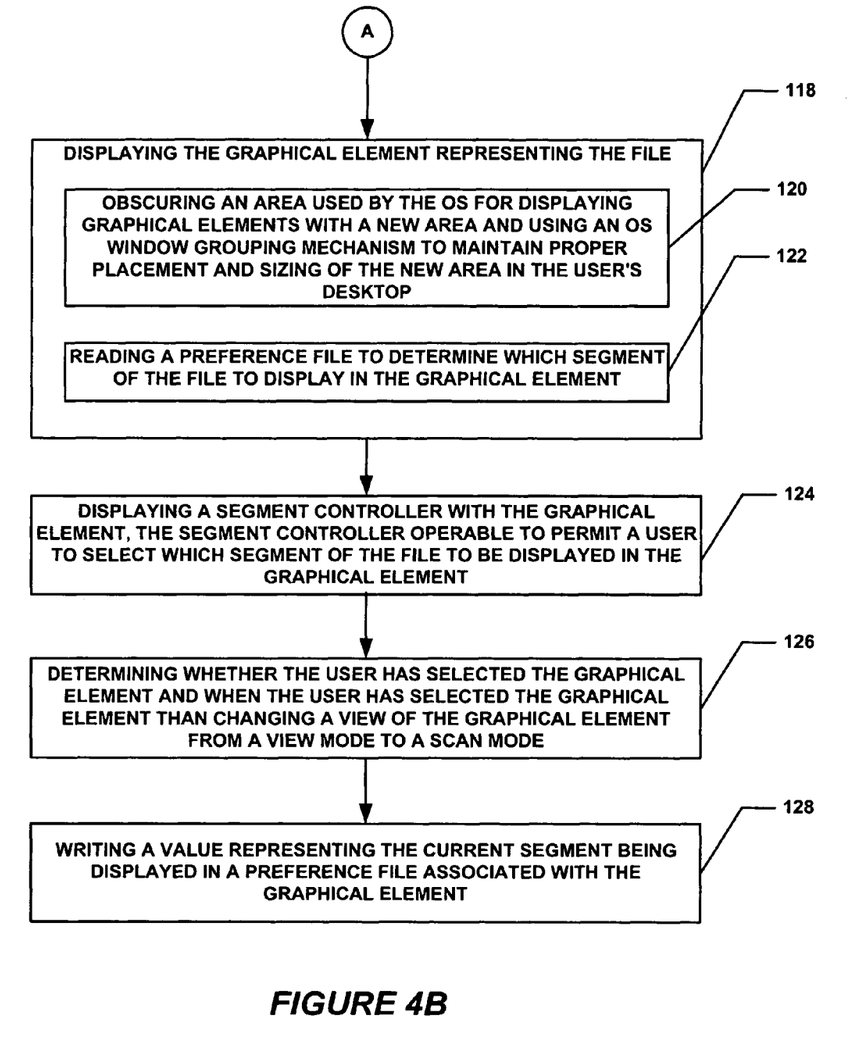
Figure 5:
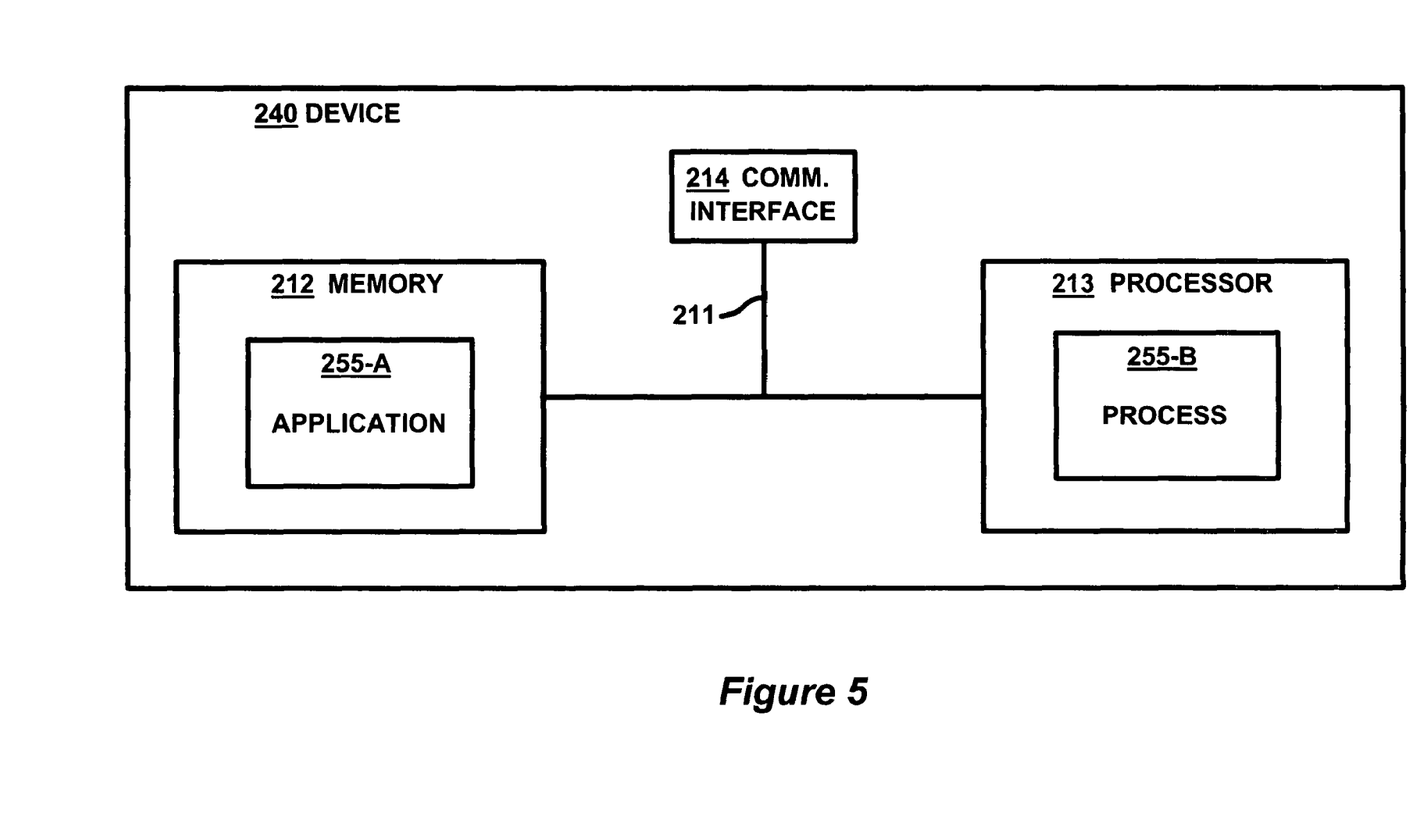
FIG. 5 illustrates an example computer system architecture for a computer system that displays graphical elements in a GUI in accordance with embodiments of the invention.

A flow chart of a particular embodiment of the presently disclosed method is depicted in FIGS. 4A and 4B. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 4A and 4B, a particular embodiment of a method 100 of displaying a graphical element within a graphical user interface is shown. The method 100 begins with processing block 102 which discloses registering with an operating system (OS) to be sent a notification when a predetermined file type is being displayed in a user's desktop. This is done for a particular file type determined by the user.

Processing block 104 states receiving an event notification regarding the graphical element. Processing block 106 recites receiving an event notification indicating the graphical element has been selected by the user (e.g. by a mouse click, hover, keyboard, touch screen or by any input device or the like). One of the events the registration has been made for is when the particular element has been selected by the user. Other events may also result in a notification being sent. Processing block 108 discloses presenting the user with an option to display a selected segment associated with the graphical element. This may be accomplished by presenting a pop-up menu including this option which the user can click on.

Processing block 110 recites determining a file to display as a graphical element. This may be accomplished, as disclosed in processing block 112, by reading a target directory to obtain a list of files to display.

Processing continues with processing block 114 which states determining where to position the graphical element in the user's desktop. In one embodiment this may be accomplished, as recited in processing block 116, by reading an OS file to determine where each graphical element should be placed within the new area. Thus, the graphical elements will be positioned in the same location as they would otherwise be positioned on the users desktop.

Processing block 118 discloses displaying the graphical element representing the file. This may include, as shown in processing block 120, obscuring an area used by the OS for displaying graphical elements with a new area and using an OS window grouping mechanism to maintain proper placement and sizing of the new area in the user's desktop. This may further include, as recited in processing block 122, reading a preference file to determine which segment of the file to display in the graphical element.

Processing block 124 recites displaying a segment controller with the graphical element, the segment controller operable to permit a user to select which segment of the file to be displayed in the graphical element. The segment controller may be shown within the graphical element, such as by a sliding bar to allow the user to navigate through the various segments of the document and selecting a segment to be displayed within the graphical element.

Processing block 126 states determining whether the user has selected the graphical element and when the user has selected the graphical element then changing a view of the graphical element from a view mode to a scan mode. Once in scan mode, different segments of the document can be rendered within the graphical element.

Processing block 128 discloses writing a value representing the current segment being displayed in a preference file associated with the graphical element. The preference file is accessed when the graphical element is rendered in order to obtain the correct segment to provide in the graphical element.

FIG. 6 illustrates an example architecture of a computer system that is configured as a host computer system 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the agent application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method comprising:
  registering with an operating system (OS) to be sent a notification when a predetermined file type is being displayed in a display device;
  receiving an event notification regarding a graphical element, said event notification indicating said graphical element has been selected by a user;
  determining a file to display as said graphical element;
  displaying said graphical element representing said file;
  determining whether the user has selected said graphical element, and when the user has selected said graphical element, then changing a view of said graphical element from a view mode to a scan mode wherein said view mode renders said graphical element representing a single segment of said file and wherein said scan mode renders said graphical element representing a plurality of segments of said file;
  displaying a segment controller with said graphical element, said segment controller operable to select which segment of said file to be displayed in said graphical element;
  wherein displaying a segment controller with said graphical element comprises:
  providing a counter associated with said segment controller, said counter displaying:
    i) a segment count associated with said file, and
    ii) a segment number associated with a page of said file currently rendered as said graphical element; and
  reading a preference file to determine which segment of said file to display in said graphical element in the view mode, where the segment is identified in the scan mode and saved to the preference file;
  wherein said displaying said graphical element comprises: obscuring an area used by said OS for displaying graphical elements with a new area and using an OS window grouping mechanism to maintain proper placement and sizing of said new area in said user's desktop.

2. The method of claim 1 further comprising presenting an option to display a selected segment associated with said graphical element.

3. The method of claim 1 further comprising reading an OS file to determine where each graphical element should be placed within said new area.

4. The method of claim 1 wherein said segment controller is only visible when the graphical element is selected and wherein said segment controller occupies real estate on said display device normally occupied by a name of said file represented by said graphical element.

5. The method of claim 1 wherein said displaying said graphical element comprises providing a user with an option to view the graphical elements as thumbnail images.

6. The method of claim 1 further comprising:
receiving notification of a selection of said segment controller, and
updating said counter according to said selection of said segment controller.

7. The method of claim 6 wherein updating said counter according to said selection of said segment controller comprises:
increasing said counter as the user steps forward through the plurality of segments; and
decreasing said counter as the user steps backwards through the plurality of segments.

8. The method of claim 1 wherein reading a preference file to determine which segment of said file to display in said graphical element comprises:
receiving a preference event from a user, the preference event selected from at least one of the group consisting of:
i) selecting an icon;
ii) closing a window in which the graphical element is displayed; and
iii) selecting an area in the window not occupied by an icon.

9. The method of claim 8 comprising:
based on the preference event received from the user, recording a current segment displayed value indicating which segment of said file to display in said graphical element; and
saving the current segment displayed value to the preference file.

10. The method of claim 1 comprising:
receiving a notification that the user desires to access said file; and
invoking an application associated with said file allowing the user to interact with said file.

11. The method as in claim 1, wherein obscuring an area used by said OS for displaying graphical elements with a new area includes:
identifying a spatial area consumed by a selectable icon, the selectable icon representative of a digital document; and
displaying a rendered view of page content, the rendered view of page content replacing display of the selectable icon in the spatial area, a first page included in the digital document comprising a source of the page content.

12. The method as in claim 11, wherein changing the view of said graphical element from a view mode to a scan mode includes:
while in the scan mode:
displaying, in the spatial area, a current rendering of a view of the first page;
receiving a user request to scan through the digital document;
in response to the user request, replacing the current rendering of the view of the first page in the spatial area with a current rendering of a view of a second page included in the digital document.

13. The method as in claim 11, comprising:
wherein identifying a spatial area consumed by a selectable icon representative of a digital document includes: identifying a location of a file name displayed concurrently with the selectable icon;
upon receiving a user request to initiate the scan mode, replacing the file name text with a rendering of an active scroll bar, the scroll bar rendered at the location of the file name; and
wherein receiving the user request to scan through the digital document includes: detecting a movement of the scroll bar, the movement representing the user request to scan to at least one page of the digital document not currently in view in the spatial area.

14. A physical non-transitory computer readable medium having computer readable code thereon, the medium comprising:
instructions for registering with an operating system (OS) to be sent a notification when a predetermined file type is being displayed in a display device;
instructions for receiving an event notification regarding a graphical element, said event notification indicating said graphical element has been selected by a user;
instructions for determining a file to display as said graphical element;
instructions for displaying said graphical element representing said file;
instructions for determining whether the user has selected said graphical element, and when the user has selected said graphical element, then changing a view of said graphical element from a view mode to a scan mode wherein said view mode renders said graphical element representing a single segment of said file and wherein said scan mode renders said graphical element representing a plurality of segments of said file;
instructions for displaying a segment controller with said graphical element, said segment controller operable to select which segment of said file to be displayed in said graphical element;
wherein displaying a segment controller with said graphical element comprises instructions for:
providing a counter associated with said segment controller, said counter displaying:
i) a segment count associated with said file, and
ii) a segment number associated with a page of said file currently rendered as said graphical element; and
reading a preference file to determine which segment of said file to display in said graphical element in the view mode, where the segment is identified in the scan mode and saved to the preference file wherein said displaying said graphical element comprises instructions for: obscuring an area used by said OS for displaying graphical elements with a new area and using an OS window grouping mechanism to maintain proper placement and sizing of said new area in said user's desktop.

15. The computer readable medium of claim 14 further comprising instructions for reading an OS file to determine where each graphical element should be placed within said new area.

16. The computer readable medium of claim 14 further comprising instructions for writing a value representing the current segment being displayed in the preference file associated with said graphical element.

17. The computer readable medium of claim 14 wherein said graphical element is selected from the group consisting of a thumbnail and an icon.

18. A computer system comprising:
a memory;
a processor;
a communications interface;
an interconnection mechanism coupling the memory, the processor and the communications interface; and wherein the memory is encoded with an application that when performed on the processor, provides a process for processing information, the process causing the computer system to perform the operations of:

registering with an operating system (OS) to be sent a notification when a predetermined file type is being displayed on a display device;

receiving an event notification regarding the graphical element, said event notification indicating said graphical element has been selected by the user;

determining a file to display as a graphical element;

displaying said graphical element representing said file;

determining whether the user has selected said graphical element, and when the user has selected said graphical element, then changing a view of said graphical element from a view mode to a scan mode wherein said view mode renders said graphical element representing a single segment of said file and wherein said scan mode renders said graphical element representing a plurality of segments of said file;

displaying a segment controller with said graphical element, said segment controller operable to select which segment of said file to be displayed in said graphical element;

wherein displaying a segment controller with said graphical element comprises:

providing a counter associated with said segment controller, said counter displaying:

i) a segment count associated with said file, and ii) a segment number associated with a page of said file currently rendered as said graphical element; and reading a preference file to determine which segment of said file to display in said graphical element in the view mode, where the segment is identified in the scan mode and saved to the preference file, wherein said displaying said graphical element comprises: obscuring an area used by said OS for displaying graphical elements with a new area and using an OS window grouping mechanism to maintain proper placement and sizing of said new area in said user's desktop.

19. The computer system of claim 18 wherein said operation of determining a file to display comprises instructions for reading a target directory to obtain a list of files to display, wherein the computer system further performs the operations of:

presenting said user with an option to display a selected segment associated with said graphical element;

reading an OS file to determine where each graphical element should be placed within said new area; and writing a value, representing the current segment being displayed, in the preference file associated with said graphical element.

20. The method of claim 19 wherein writing a value representing the current segment being displayed in the preference file associated with said graphical element comprises:

receiving a user browsing event, the user browsing event modifying the current segment being displayed;

receiving a user interrupt event;

upon receiving the user interrupt event, discarding the value representing the current segment being displayed; and canceling the modifying of the current segment being displayed.

* * * * *